No. 881,997. PATENTED MAR. 17, 1908.
F. A. BROWNELL.
PHOTOGRAPHIC ENLARGING CAMERA.
APPLICATION FILED JAN. 25, 1904.
5 SHEETS—SHEET 5.
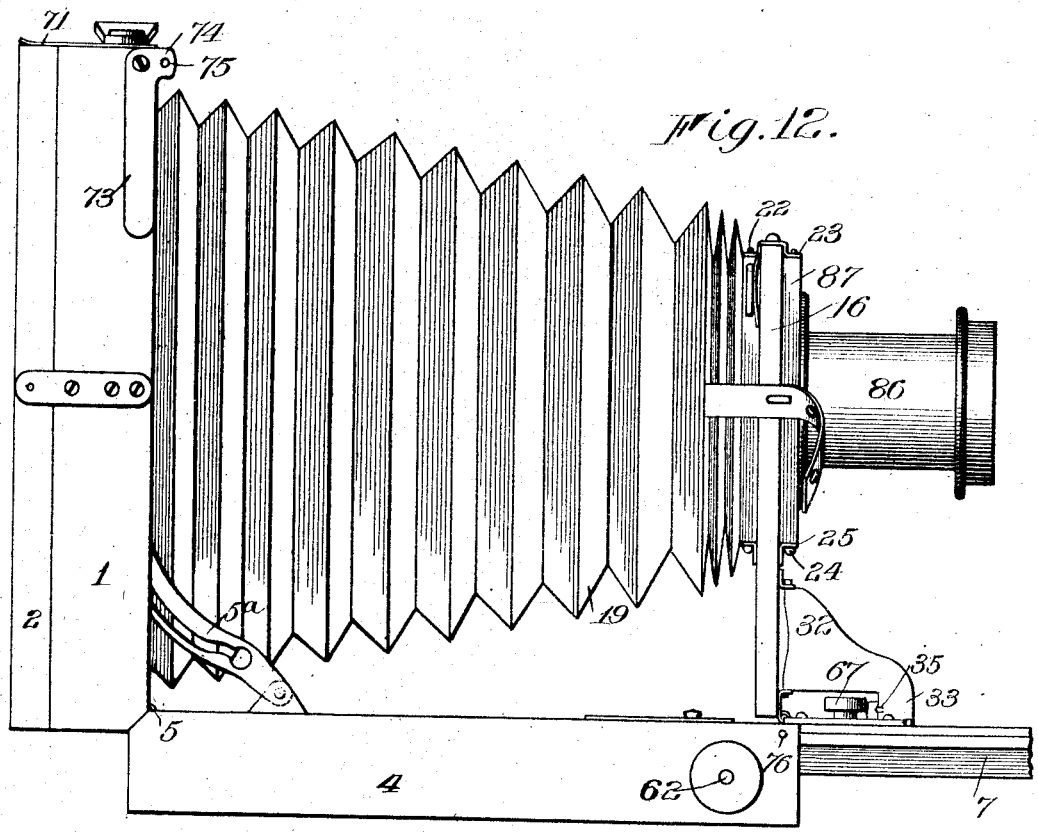
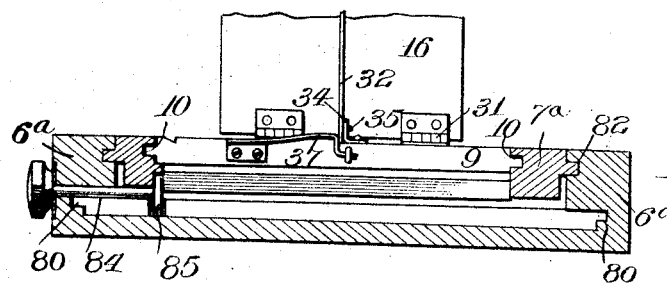

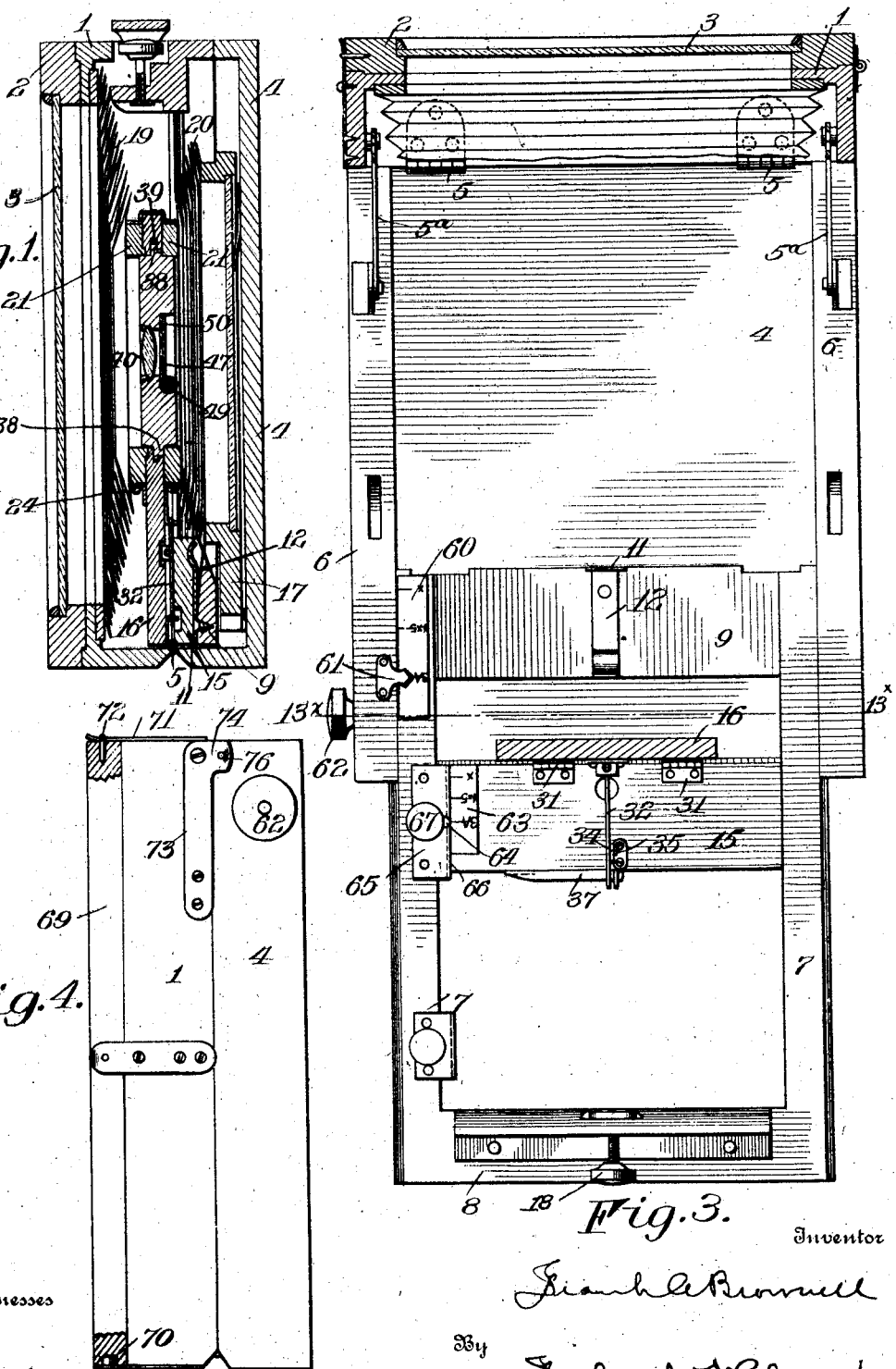

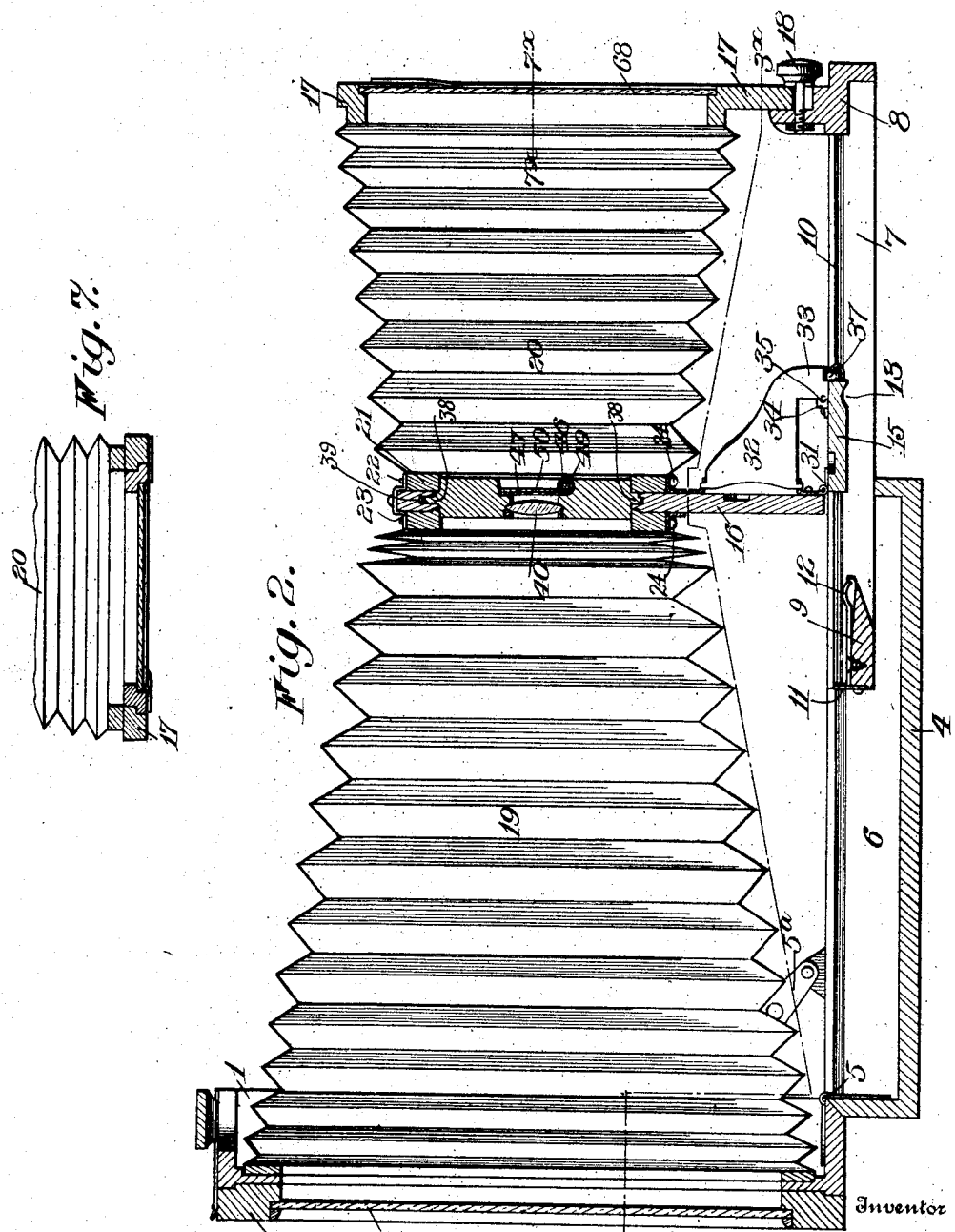

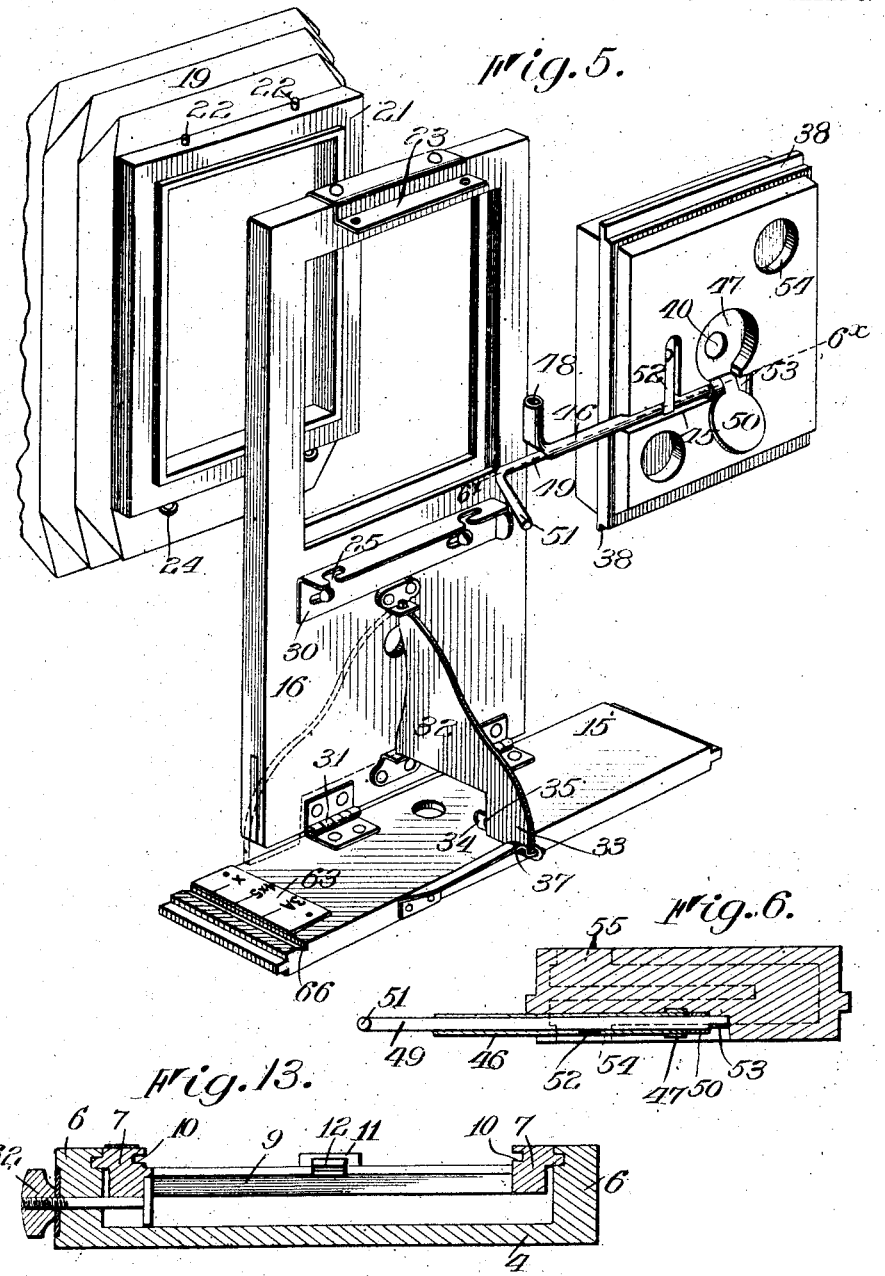

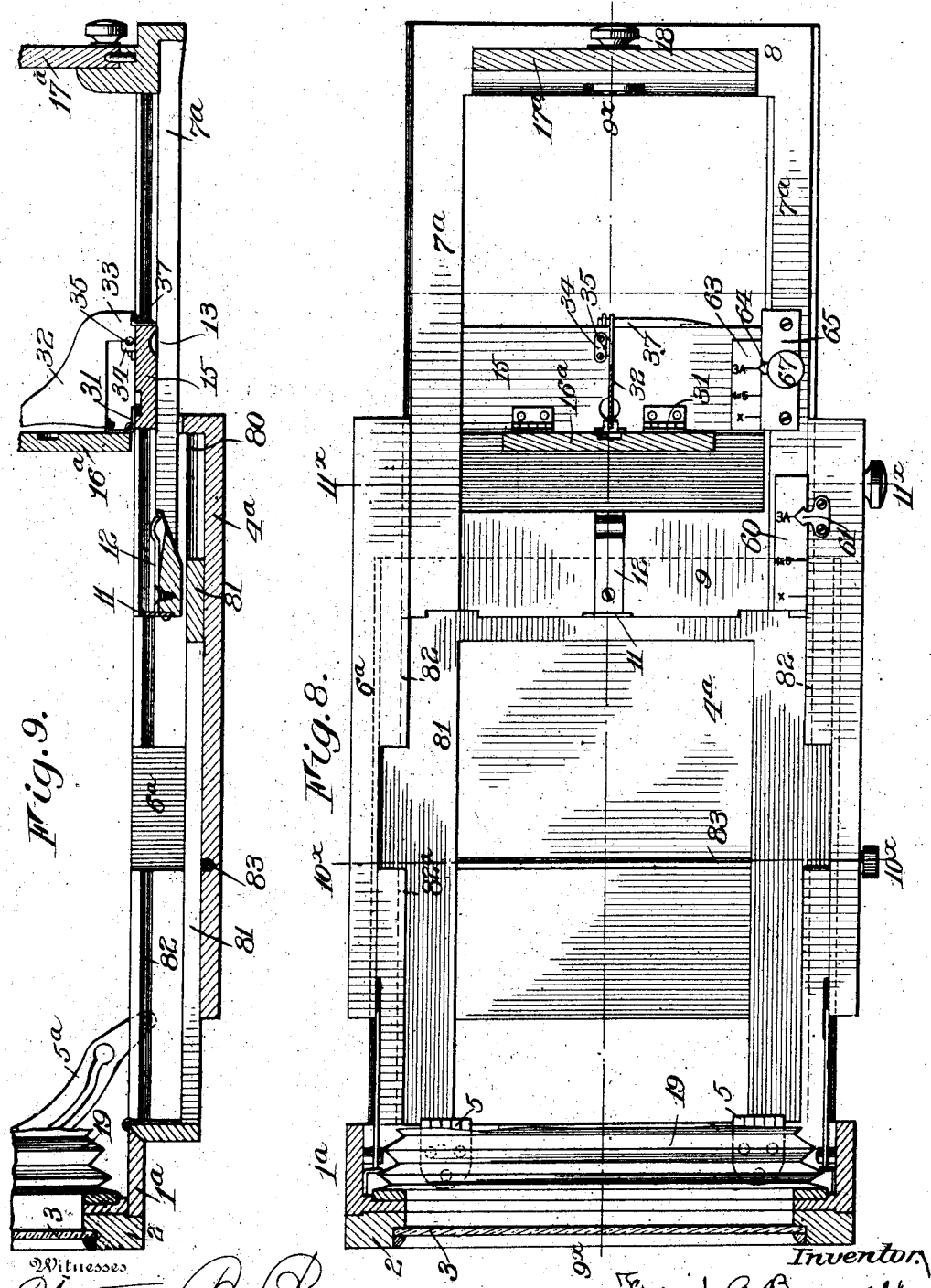

UNITED STATES PATENT OFFICE.

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC ENLARGING-CAMERA.

No. 881,997.　　Specification of Letters Patent.　　Patented March 17, 1908.

Application filed January 25, 1904. Serial No. 190,529.

*To all whom it may concern:*

Be it known that I, FRANK A. BROWNELL, of Rochester, in the county of Monroe and State of New York, have invented certain new and useful Improvements in Photographic Enlarging-Cameras; and I do hereby declare the following to be a full, clear, and exact description of the same, reference being had to the accompanying drawings, forming a part of this specification, and to the reference-numerals marked thereon.

My present invention relates to photographic cameras and particularly such as are employed for making enlargements, from photographic negatives or for making copies of negatives upon a smaller scale and adapting them for uses such as lantern slides or transparencies, and it has for its object to provide an apparatus that is capable of being folded into a small compass and which shall consist of few parts that are simple in construction and capable of being readily assembled.

My invention has for its further object to provide a camera in which the negative holder may be adjusted relatively to the focusing screen or plate holder, and the lens support is also capable of a movement relatively to either of said holders, the necessary adjustment between the different parts being indicated by scales provided with relatively arranged indices or characters which indicate the proper position of the several parts to obtain the best results from a negative of a given size.

To these and other ends the invention consists in certain improvements and combinations of parts, all as will be hereinafter more fully described, the novel features being pointed out in the claims at the end of the specification.

In the drawings: Figure 1 is a cross sectional view of an enlarging camera constructed in accordance with my invention showing the parts in a collapsed or folded position. Fig. 2 is a side elevation thereof, portions of the frame being shown in section to better illustrate the construction of the parts. Fig. 3 is a horizontal sectional view taken on the line $3^\times 3^\times$ of Fig. 2. Fig. 4 is an end elevation similar to Fig. 1, showing the application of the plate holder to the rear of the camera. Fig. 5 is a detail perspective view of the lens support, and Fig. 6 is a cross sectional view of the lens board taken on the line $6^\times 6^\times$ of Fig. 5. Fig. 7 is a detail sectional view taken on the line $7^\times 7^\times$ of Fig. 2. Fig. 8 is a plan view similar to Fig. 3 illustrating a modified construction of the bed, and Fig. 9 is a longitudinal sectional view taken on the line $9^\times 9^\times$ of Fig. 8. Fig. 10 is a sectional view on the line $10^\times 10^\times$ of Fig. 8. Fig. 11 is a similar view taken on the line $11^\times 11^\times$ of Fig. 8. Fig. 12 is a view showing the front portion of the camera removed and a suitable lens mounted on the support to adapt a portion of the apparatus to be used as an ordinary camera. Fig. 13 is a sectional view on the line $13^\times 13^\times$ of Fig. 3.

Similar reference numerals in the several figures indicate similar parts.

In carrying out my invention I employ a hollow rectangular casing embodying the back 1 which forms a support for the plate holder and is normally closed by a hinged door frame 2 containing the usual ground glass focusing screen 3. The front section 4 of the camera is hinged to the section 1 at the point 5 and is adapted to be folded down into a horizontal position to form the camera bed and support for the negative and lens holders which are adjustable relatively to each other and also to the focusing screen 3 as will be further described. When the camera is opened the section 4, forming the bed, is rotated into a horizontal position and the rear section 1 is held in a vertical position by braces or arms $5^a$, as will be understood from an inspection of Figs. 2 and 3. This bed section comprises the upwardly extending sides or strips 6 provided upon their proximate faces with grooves or channels forming ways in which is mounted an adjustable frame or extensible bed, formed of the side pieces 7 connected at their forward ends by a cross piece 8 and at their opposite extremities by a similar piece 9. At the inner sides of the strips 7 are also provided grooves or channels 10 forming ways in which is supported a longitudinally adjustable carriage 15, forming the base for the lens support 16 which is arranged intermediate the focusing screen 3, and the negative holder 17, removably connected to the cross piece 8 on the extensible portion of the bed by means of the clamping screw 18. As the carriage in its normal position is moved rearwardly to the inner end of the bed 7, when not in use, the cross piece 9 is cut away at its upper side and at its rear edge is a stop 11 against which the carriage is held by a leaf spring 12, the end of which engages in recess 13, as will be understood.

The section 1 and the lens support is connected by the collapsible bellows 19 and also arranged between said support and the negative holder is a similar bellows 20, both of which are attached at their outer ends to the section 1 and to the negative holder respectively and provided at their inner or proximate ends with rectangular frames 21, provided with pins 22, adapted to be secured in suitable apertures formed in flanges 23 attached to the lens support 16. These frames are also supplied at their lower sides with headed projections 24 which are adapted to be engaged in the open ends of slots 25 provided in the adjustable plates 30 which are movable transversely of the lens support, whereby the projections 24 may be engaged therein to removably connect the frames 21 to said support, as will be understood from the detail construction of the parts illustrated in Fig. 5.

In order to allow the section 4, comprising the extensible bed and carrying the lens support carriage 15, to be folded as shown in Fig. 1, I form a movable connection between the carriage and the support which in the present instance is shown as consisting of hinges 31 and to hold the support in its normal position, as shown in Fig. 2, I provide thereon a pivoted bracket or bracing arm 32. The outer end 33 of the latter is adapted to coöperate with a stop 34 on the carriage 15 and it is provided with a projection 35 adapted to engage in a suitable recess formed in said stop. Also coöperating with the end of the arm is a spring 36 which operates to hold the bracket in engagement with the stop and to prevent the disengagement of the projection 35 so that when it is desired to use the apparatus, the lens support may be securely held in a vertical position.

The lens board illustrated particularly in Fig. 5 is rectangular and is secured in an aperture in the support 16, opposite sides of which are provided with grooves adapted to receive tongues 38 on the lens board whereby it is removably secured in position. The relative height of the board to the diameter of the said aperture is such that the board may be shifted vertically to disengage the lower one of the tongues 38 to permit the lower edge of the board to be tilted outwardly and the tongue at its upper edge removed, as will be understood, but when in its normal position the board is held securely in position by means of a leaf spring 39 arranged in one of the grooves, as shown in Figs. 1 and 2. The board is provided with a central aperture in which is arranged a lens 40 and at one side of the board the aperture is enlarged to form a recess and leading from the lower side thereof is a groove or channel 45 in which is journaled the tubular shaft 46 carrying the apertured diaphragm or lens stop 47 and having at its outer end the operating handle 48. Extending through the tubular shaft is a shaft 49 provided at its inner end with a shutter 50 and having its outer end bent to form the handle 51, arranged in proximity to the handle 48 whereby the diaphragm or the shutter may be operated either separately or together.

In order to hold the diaphragm and the shutter, when adjusted, either in the open or closed position I provide the shaft 46 with flattened surfaces with which coöperates a leaf spring 52, and I also provide similar surfaces on the shaft 49 which are engaged by a spring 53, as shown in Figs. 5 and 6.

As the lens support is adapted to be moved backward and forward between the negative holder and the focusing screen I provide the lens board with circuitous or tortuous passages opening through apertures 54, into the bellows 20 and connected by similar apertures 55 (indicated by dotted lines in Fig. 6) with the bellows 19, said apertures being at opposite sides of a division wall or partition, so that the air may circulate freely from one bellows into another without the possibility of admitting light through said passages.

To facilitate an adjustment of the various parts of the apparatus the extensible bed is provided with a scale 60 with which coöperates a finger or pointer 61, on one of the sides 6 of the relatively stationary portions of the bed, to indicate the relative positions of the negative holder and the focusing screen, and to clamp the beds together, I employ a binding screw 62. The lens support, which is independently movable upon the extensible bed, is also provided with a scale 63 coöperating with an index finger 64 on a clamping plate 65, having a downwardly projecting edge, adapted to engage in a groove 66, formed in the carriage 15, and to secure the latter in adjusted position when the nut 67 is adjusted.

The scales 60 and 63 are provided with similar characters such as 3A, 4×5 and X which indicate the relative positions assumed by the lens and the negative holder when these parts are adjusted to obtain an enlargement of a negative corresponding to such characters on the scale, and for convenience these index characters preferably indicate well known sizes of photographic plates or negatives. These indices on the scales also bear a relationship to the size of the focusing screen 3 so that when the bed and lens are in corresponding positions of adjustment, the enlargement of the plate or negative will be of such a size as to be included on said focusing screen. For example, if it is desired to enlarge a negative corresponding in length and width to the size known as 3A it is secured in the holder 17 and the operator adjusts the extensible bed outwardly until the finger 61 registers with the said index on the scale 60, as shown in Figs. 3 and 8. The lens support 15 is also adjusted until the corresponding index on the scale 63 registers with the finger 64 when the enlargement of the negative will be clear cut and just included within the limits of the focusing screen. By employing the two relatively graduated scales accurate results can be obtained without the loss of time or the possibility of inaccuracies arising from an improper adjustment of the parts which are liable to occur if both the negative holder and the lens support are required to be adjusted by the operator while viewing the enlarged picture on the focusing screen in the usual manner.

In Fig. 4 I have shown a plate holder 69 substituted for the focusing screen 3 and secured by the holders 70 and the spring fingers 71 coöperating with the pins 72 on the holder.

The parts may be collapsed by loosening the binding screws 62 and 67 and moving the extensible portion of the bed inwardly, then moving the carriage 15 to its innermost position and disconnecting the negative holder by loosening the screw 18. The holder may then be inserted between the cross pieces 8 and 9 of the extensible bed, and if the bracket 32 is then moved upon its pivot, into the position shown in dotted lines in Fig. 5, the section 4 may be revolved upon its hinges 5 and the camera closed, as shown in Figs. 1 and 4. To hold the parts in this position the spring catches 73 are provided upon the upper corners of the section 1 which have the outer forwardly extending perforated ends 74 adapted to coöperate with pins 76 on the section 4.

In Figs. 8 and 9 I have shown a modification of the camera bed in which the base or support 4ª is provided with the upwardly extending sides 6ª having the lower set of grooves or ways 80 in which is mounted a frame 81 adapted to move rearwardly and carrying the rear section 1ª of the camera. The sides 6ª are each provided with an upper set of grooves or ways 82 arranged in alinement with similar grooves 82ª formed in the frame 81 and in which the longitudinally extensional bed 7ª, carrying the negative holder 17ª and the lens support 16ª, is adapted to slide. A clamping bolt 83 is provided for securing the frame 81 in adjusted position and a similar bolt 84, having at its inner end a plate 85 engaging the edge of the bed 7ª, is also provided for securing the latter in adjusted position. This arrangement is illustrated as showing a convenient means of providing telescopic or collapsing parts whereby a greater range of adjustment is permitted between the negative holder and the focusing screen, or plate holder employed in lieu thereof, at the rear side of section 1.

The ease with which the negative holder and the bellows 20 may be detached admirably adapts the remaining portion of the apparatus for use as an ordinary camera and in Fig. 12 I have so illustrated the device and have shown a lens tube 86 attached to a frame 87, similar to the frames 21, and secured to the lens support 16ª.

A camera constructed in accordance with my invention consists of few parts capable of being easily formed and assembled. By arranging the parts as shown I am enabled to provide an apparatus that is admirably adapted for the purposes specified and one in which the parts, when folded, are very compact.

While I have confined the description to the making of enlargements, it will be understood that reductions such as lantern slides may be made directly from a larger negative in which event the plate containing the negative picture is mounted in place of the focusing screen 3 and the plate on which the positive picture is to be reproduced is supported on the holder 17.

I claim as my invention:

1. In a photographic enlarging camera the combination with a casing comprising pivotally connected front and rear sections and a bed adjustable longitudinally on the front section, of a holder for a plate or negative mounted on the outer end of the bed, a lens support also mounted on the bed and adjustable thereon between said holder and the rear section and bellows arranged between the latter and the support and holder and support.

2. The combination with hollow front and rear sections hinged together, of a holder for a plate or negative supported on the front section and adapted to be contained therein when not in use, a lens support adjustably mounted on the front section and adapted to be contained in the rear section when not in use and collapsible bellows arranged between the lens support and the rear section and the holder.

3. The combination with hinged front and rear sections, a holder for a plate or negative mounted on the front section and an adjustable carriage arranged on the latter, of a lens support pivoted to the carriage and bellows arranged between said support and the rear section and the holder.

4. The combination with front and rear sections, hinges connecting them and a holder for a plate or negative mounted on one of the front sections, of a carriage, a lens support and hinges connecting the support and carriage, means for adjusting the latter to move the hinges into approximate alinement with the pivoted centers of the hinges connecting said front and rear sections and bellows connecting the lens support with the rear section and the holder.

5. The combination with front and rear sections, a lens support adapted to be contained in the rear section and a bellows connecting it therewith, of a carriage attached to the lens support and adjustably mounted on the front section, a holder for a plate or negative adapted to be contained in the front section, means for supporting it in an upright position on the latter and a bellows connecting the holder and lens support.

6. The combination with front and rear sections, a lens support adapted to be contained in the rear section and a bellows connecting it therewith, of a carriage pivotally attached to the lens support and adjustably mounted on the front section, a brace arm between the carriage and the support for maintaining the latter in operative position, a holder for a plate or negative removably mounted on the front section and adapted to be contained therein and a bellows connecting the holder and the lens support.

7. The combination with front and rear sections, a lens support adapted to be contained in the rear section and a bellows connecting it therewith, of a carriage pivotally attached to the lens support and adjustably mounted on the front section, a brace arm arranged between the carriage and support pivotally mounted on one of said parts and coöperating with a stop on the other part to hold the support in operative position, a holder or a plate or negative and a bellows connecting said holder and lens support.

8. In a photographic enlarging camera the combination with a bed, a holder for a plate or negative located at one end thereof and a focusing screen arranged at the other end, of a lens support mounted between the holder and screen, bellows extending inwardly from the focusing screen and holder to the support and provided at their inner ends with frames and locking devices detachably connecting both of said frames to the lens support.

9. In a photographic camera the combination with a casing, a lens support and a bellows connecting them, of a frame attached to one end of the bellows and locking devices detachably connecting the frame to the lens support.

10. In a photographic camera embodying a casing and a lens support, a bellows arranged between the parts, a frame attached to the end of the bellows and locking devices for detachably connecting it to the contiguous part of the camera.

11. In a photographic camera the combination with a casing forming a support for a focusing screen, a lens support and a bellows arranged between said supports, of a frame connected to the end of the bellows and interlocking devices arranged respectively on said frame and the proximate support whereby the bellows may be detached therefrom.

12. In a photographic camera the combination with a casing forming a support for a focusing screen, a lens support and a bellows arranged between said supports, of a frame attached to the bellows, interlocking projections between one edge of the frame and the proximate support and a securing device on the latter coöperating with the opposite edge of the frame.

13. In a photographic camera, the combination with a casing, a lens support, and a bellows arranged between them, of a frame attached to the end of the bellows having projections at its opposite edges, a device on the lens support engaging the projections at one side of the frame and a movable locking device coöperating with those at the opposite side of said frame.

14. In a photographic camera the combination with a casing, a lens support, and a bellows arranged between them, of a frame attached to the end of the bellows having projections at opposite sides, an apertured flange on the lens support adapted to receive the projections on one side of the frame, and a movable flange having open ended slots adapted to receive the projections at the opposite sides of said frame.

15. In an enlarging camera the combination with a bed, a rear frame and a holder for a plate or negative, of a lens support arranged between said frame and holder, bellows attached at their outer ends to both of the latter and frames provided at their inner ends having projections thereon, flanges extending outwardly from the lens support and adapted to receive the projections at one side of each of said frames, and movable members on the support having open ended slots adapted to receive the projections at the other side of each of said frames to removably secure them to the support.

16. In an enlarging camera the combination with a rear frame, and a bed movable relatively thereto, a holder for a plate or negative thereon and an adjustable lens support arranged between the rear frame and holder, of two scales provided with corresponding index marks and separate pointers coöperating with said scales to indicate the relative positions of adjustment of the holder and the lens support.

17. In an enlarging camera the combination with a rear frame, and a bed movable relatively thereto, a holder for a plate or negative thereon and an adjustable lens support arranged between the rear frame and holder, of a scale and a pointer coöperating therewith arranged to indicate the position of the bed, a second scale and pointer arranged to indicate the position of the lens holder, said scales being provided with corresponding index marks.

18. In an enlarging camera the combination with a rear frame, and a bed movable relatively thereto, a holder for a plate or negative thereon and a lens support adjustably mounted on the bed, of a scale and pointer for indicating the relative adjustment of the bed on the frame and a second scale and pointer indicating the position of adjustment of the lens support, said scales being provided with corresponding and relatively arranged index marks.

19. In an enlarging camera the combination with a rear frame, and a bed movable relatively thereto, a holder for a plate or negative thereon and a lens support adjustably mounted on the bed, of a scale and pointer for indicating the relative adjustment of the bed on the frame and a second scale and pointer indicating the position of adjustment of the lens support, said scales being provided with corresponding relatively arranged index marks, designated by characters indicating regular sizes of plates or negatives that may be held in the holder whereby the bed and lens support may be adjusted into the proper relative positions to each other and to the rear frame.

20. In a photographic camera the combination with a casing, a bed having ways and a lens carriage movably supported thereon, of a scale on the carriage and a clamping device on the bed adapted to engage the carriage and provided with an index finger coöperating with the scale.

21. In a photographic enlarging camera the combination with a casing composed of a rear section and a front section having the side pieces forming ways, of an extensible bed provided with side pieces movably supported in said ways and provided with channels, a carriage supported in the latter, a lens support mounted on the carriage, a holder for a plate or negative mounted on the bed and bellows arranged between the lens support and the holder and rear section.

22. In a photographic enlarging camera the combination with a casing composed of a rear section and a front section having side pieces forming ways, of a hollow extensible bed comprising the side pieces supported in the ways and provided with channels, a carriage supported in the latter and a lens support hinged to the carriage, a holder for a plate or negative removably mounted on the bed and adapted to be contained therein when not in use and bellows extending between the lens support and the rear section and holder.

23. In a photographic enlarging camera the combination with a casing comprising a rear section and a front section hinged thereto and embodying the side portions having ways, a frame comprising the inner and outer ends and having side pieces movably secured in the ways and provided with channels, of a stop on the inner end of the frame, a carriage supported in said channels and a lens support hinged to the carriage, means for holding the latter in engagement with the stop, a holder for a plate or negative detachably supported on the outer end of the frame, and bellows extending between the lens support and the rear section and holder.

24. In a photographic enlarging camera, the combination with a casing, a bed and a holder for a plate or negative mounted thereon, of an adjustable lens support arranged between the casing and holder provided with a tortuous air passage leading from one side of the support to the other and bellows connecting the casing and holder to opposite sides of the support, the chamber within the two bellows communicating with the air passage.

25. In a photographic enlarging camera the combination with a casing, a bed and a holder for a plate or negative arranged thereon, of a lens support adjustably mounted between the casing and the holder and bellows connected at its opposite sides and connected to the casing and holder, a removable lens board mounted on the support and provided with a tortuous air passage connecting the two bellows.

26. In a photographic enlarging camera the combination with a rear section, a front section and a bed attached to the former and movable rearwardly on the latter, of a forwardly extensible bed mounted on the front section, a holder for a plate or negative carried on said bed, a lens support arranged between the rear section and the holder and bellows connecting it with said parts.

27. In a photographic enlarging camera the combination with a rear section, a front section comprising a base having sides provided with two sets of ways and a bed attached to the rear section and guided in one of said sets of ways, of a forwardly extensible bed guided in the other set of ways and a holder for a plate or negative thereon, an adjustable lens support arranged between the rear section and holder and bellows connecting it with said parts.

28. In a photographic enlarging camera the combination with a rear section, a front section comprising a base having sides provided with two sets of ways and a bed attached to the rear section embodying the side rails guided in one of said sets of ways and provided with channels adapted to form a continuation of the other set of ways, of an extensible bed guided in the latter and a holder for a plate or negative arranged on said bed, a lens support arranged between the rear section and holder and bellows connecting it with said parts.

29. In an enlarging camera, the combination with two beds having an adjustable sliding connection, a lens support adjustably mounted upon one of said beds and supports for a negative and sensitized material connected to the respective beds, bellows connecting one of said supports with the lens support, a separate bellows detachably connected to the latter and attached to the other support and connections between said beds and supports permitting them to be folded parallel into a flat package.

30. In an enlarging camera, the combination with the two beds having an adjustable sliding connection, of a lens support adjustably mounted upon one bed and hinged to fold substantially parallel therewith, supports for a negative and for sensitized material, one of said supports being hinged to a bed to fold parallel therewith and the other support detachably connected to the other bed and a bellows connecting the hinged support and lens support, said supports and beds being arranged to extend in parallel planes when the camera is folded.

31. In an enlarging camera, the combination with two beds, having an adjustable sliding connection, of a lens support adjustable along one bed and hinged to fold parallel therewith, a negative support detachably connected to the bed carrying the lens support, a support for sensitized material hinged to the other bed, a bellows connecting the last mentioned support and the lens support and a bellows connecting the lens and negative supports, said supports and beds being adapted to be folded to occupy parallel planes when one of the bellows is disconnected.

32. In an enlarging camera, the combination with the hollow back adapted to support sensitized material, of the hollow bed section hinged thereto, the supplemental bed sliding on the latter, the lens support adjustable upon the supplemental bed and hinged to fold parallel therewith, the negative support detachably connected to the supplemental bed, the bellows connecting it with the lens support, and the bellows connecting said lens support with the hollow back, the parts being so arranged that when one end of one of the bellows is disconnected the camera may be folded flat between the back and bed section.

FRANK A. BROWNELL.

Witnesses:
  G. WILLARD RICH,
  RUSSELL B. GRIFFITH.